(12) United States Patent
Sakamoto et al.

(10) Patent No.: US 12,034,487 B2
(45) Date of Patent: Jul. 9, 2024

(54) OPTICAL TRANSMISSION SYSTEM

(71) Applicant: NIPPON TELEGRAPH AND TELEPHONE CORPORATION, Tokyo (JP)

(72) Inventors: Taiji Sakamoto, Musashino (JP); Masaki Wada, Musashino (JP); Takashi Yamamoto, Musashino (JP); Kazuhide Nakajima, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 228 days.

(21) Appl. No.: 17/633,902

(22) PCT Filed: Aug. 23, 2019

(86) PCT No.: PCT/JP2019/033162
§ 371 (c)(1),
(2) Date: Feb. 8, 2022

(87) PCT Pub. No.: WO2021/038661
PCT Pub. Date: Mar. 4, 2021

(65) Prior Publication Data
US 2022/0294537 A1 Sep. 15, 2022

(51) Int. Cl.
*H04B 10/61* (2013.01)
*H04B 10/2575* (2013.01)
*H04B 10/2581* (2013.01)

(52) U.S. Cl.
CPC ..... *H04B 10/614* (2013.01); *H04B 10/25753* (2013.01); *H04B 10/2581* (2013.01)

(58) Field of Classification Search
CPC ............ H04B 10/614; H04B 10/25753; H04B 10/2581; H04J 14/04
See application file for complete search history.

(56) References Cited

U.S. PATENT DOCUMENTS 6,922,445 B1 * 7/2005 Sampath ............... H04L 1/0009
375/267
RE44,959 E * 6/2014 Paulraj ................. H01Q 3/2605
375/267
(Continued)

FOREIGN PATENT DOCUMENTS

JP 2017152811 A * 8/2017

OTHER PUBLICATIONS

H. Takara et al., "1.01-Pb/s (12 SDM/222 WDM/456 GB/s) Crosstalk-managed Transmission with 91.4-b/s/Hz Aggregate Spectral Efficiency", in ECOC2012, paper Th.3.C.1 (2012).
(Continued)

*Primary Examiner* — Tanya T Motsinger
(74) *Attorney, Agent, or Firm* — Harness, Dickey & Pierce, P.L.C.

(57) ABSTRACT

An object of the present invention is to provide an optical transmission system capable of easily controlling a transmission capacity and an optical signal quality even if a MIMO equalizer is provided. The optical transmission system according to the present invention is provided with an N×M MIMO equalizer, includes receivers (N units) equal in number to the spatial multiplexing order L of an optical fiber, and changes the number M of the signal beams of light transmitted through the optical fiber in the range of the spatial multiplex order L or less. The adjustment of the number M of signal beams of light makes it possible to adjust a transmission capacity and a signal quality of the optical transmission system even after construction of the transmission line.

4 Claims, 12 Drawing Sheets

(56) References Cited

U.S. PATENT DOCUMENTS

| | | | | |
|---|---|---|---|---|
| 11,632,184 | B2* | 4/2023 | Noguchi | H04J 14/0298 398/79 |
| 2003/0081282 | A1* | 5/2003 | Yamakawa | H04J 14/0227 398/79 |
| 2003/0235252 | A1* | 12/2003 | Tellado | H04L 7/041 375/259 |
| 2009/0016263 | A1* | 1/2009 | Kishigami | H04L 1/1671 370/328 |
| 2009/0080882 | A1* | 3/2009 | Cahill | H04B 10/07953 359/325 |
| 2011/0013714 | A1* | 1/2011 | Tamaki | H04L 27/2626 375/296 |
| 2013/0084064 | A1* | 4/2013 | Akasaka | H04J 14/0221 398/25 |
| 2017/0264367 | A1 | 9/2017 | Awwad et al. | |
| 2017/0373787 | A1 | 12/2017 | Moon et al. | |
| 2019/0132048 | A1* | 5/2019 | Schmidt | H04B 10/2507 |
| 2020/0067624 | A1* | 2/2020 | Tsuzuki | H04Q 11/0066 |
| 2021/0409145 | A1* | 12/2021 | Mikami | H04B 10/60 |
| 2022/0159512 | A1* | 5/2022 | Kudo | H04W 28/082 |
| 2022/0255646 | A1* | 8/2022 | Zhan | H04B 17/345 |
| 2022/0294537 | A1* | 9/2022 | Sakamoto | H04B 10/25753 |
| 2022/0360358 | A1* | 11/2022 | Sakamoto | H04B 7/0413 |
| 2023/0327767 | A1* | 10/2023 | Takeshita | H04B 10/2581 398/173 |
| 2023/0379022 | A1* | 11/2023 | Kuchi | H04B 7/0456 |

OTHER PUBLICATIONS

T. Sakamoto et al., "Differential Mode Delay Managed Transmission Line for WDM-MIMO System Using Multi-Step Index Fiber", J. Lightwave Technol. vol. 30, pp. 2783-2787 (2012).

Y. Sasaki et al., "Large-effective-area uncoupled few-mode multi-core fiber", ECOC2012, paper Tu.1.F.3 (2012).

T.Sakamoto et al., "Twisting-Rate-Controlled 125 μm Cladding Randomly-Coupled Single-Mode 12-Core Fiber", J. Lightwave Technol. Vol. 36, Issue 2, pp. 325-330 (2018).

T. Mizuno et al., "Mode Dependent Loss Equaliser and Impact of MDL on PDM-16QAM Few-Mode Fibre Transmission", ECOC2015, P5.9 (2015).

N. Hanzawa et al., "Demonstration of mode-division multiplexing transmission over 10 km two-mode fiber with mode coupler", OFC2011, paper OWA4 (2011).

H. Uemura et al., "Fused Taper Type Fan-In/Fan-Out Device for 12 Core Multi-Core Fiber", OECC2014, pp. 49-50, (2014).

M. Taylor, "Coherent Detection for Fiber Optic Communications Using Digital Signal Processing", in Optical Amplifiers and Their Applications/Coherent Optical Technologies and Applications, Technical Digest (CD) (Optical Society of America, 2006), paper CThB1.

S. Randel et al., "MIMO-based signal processing for mode-multiplexed transmission", Proc. IEEE Summer Topical Meeting, MC4.1 Seattle (2012).

T. Sakamoto et al., "Strongly-coupled multi-core fiber and its optical characteristics for MIMO transmission systems", Optical Fiber Technology, 35, pp. 8-18 (2017).

Weng, Yi et al., "Space Division Multiplexing Optical Communication Using Few-Mode Fibers", Optical Fiber Technology 36 (2017) pp. 155-180.

Muhammad, Ajmal et al., "Resource Allocation For Space-Division Multiplexing: Optical White Box Versus Optical Black Box Networking", Journal of Lightwave Technology, vol. 33, No. 23, Dec. 1, 2015.

* cited by examiner

OPTICAL TRANSMISSION SYSTEM

CROSS-REFERENCE TO RELATED APPLICATIONS

This application is a 371 U.S. National Phase of International Application No. PCT/JP2019/033162 filed on Aug. 23, 2019. The entire disclosure of the above application is incorporated herein by reference.

TECHNICAL FIELD

The present disclosure relates to an optical transmission system using spatial multiplexing optical fibers.

BACKGROUND ART

In an optical fiber communication system, transmission capacity is limited by non-linear effects or a fiber fuse generated in optical fibers. In order to mitigate such limitations, spatial multiplexing technologies are under study, such as parallel transmission using a multi-core fiber containing a plurality of cores in one optical fiber (NPL 1), mode-multiplexing transmission using a multi-mode fiber in which a plurality of propagation modes are present in a core (NPL 2), and a few-mode multi-core fiber combining multi-core and mode-multiplexing (NPL 3).

In the multi-core fiber, in order to reduce crosstalk between signals propagating between the cores, each of the cores can be used as an independent transmission line with a distance of constant value or greater between cores (for example, 30 µm or greater). On the other hand, in transmission using the multi-mode fiber, such crosstalk occurs between the propagation modes due to a connection point in the transmission line and a fiber bending, and thus, a multiple-input multiple-output (MIMO) equalizer that compensates for an inter-mode crosstalk at a reception end is used. In a multi-core structure, a method has also been proposed in which crosstalk between cores is allowed, and a coupled multi-core fiber (with a core spacing of generally 25 µm or less) is used to compensate for crosstalk between the cores by using the MIMO equalizer similarly to the multi-mode fiber transmission (for example, NPL 4).

CITATION LIST

Non Patent Literature

NPL 1: H. Takara et al., "1.01-Pb/s (12 SDM/222 WDM/456 Gb/s) Crosstalk-managed Transmission with 91.4-b/s/Hz Aggregate Spectral Efficiency", in ECOC2012, paper Th.3.C.1 (2012)

NPL 2: T. Sakamoto et al., "Differential Mode Delay Managed Transmission Line for WDM-MIMO System Using Multi-Step Index Fiber," J. Lightwave Technol. vol. 30, pp. 2783-2787 (2012).

NPL 3: Y. Sasaki et al., "Large-effective-area uncoupled few-mode multi-core fiber," ECOC2012, paper Tu.1.F.3 (2012).

NPL 4: T. Sakamoto et al., "Twisting-rate-controlled 125 µm Cladding Randomly-coupled Single-mode 12-core Fiber," J. Lightwave Technol. vol.36, Issue 2, pp. 325-330 (2018).

NPL 5: T. Mizuno et al., "Mode Dependent Loss Equaliser and Impact of MDL on PDM-16QAM Few-mode Fibre Transmission," ECOC2015, P5.9 (2015)

NPL 6: N. Hanzawa et al., "Demonstration of mode-division multiplexing transmission over 10 km two-mode fiber with mode coupler," OFC2011, paper OWA4 (2011)

NPL 7: H. Uemura et al, "Fused Taper Type Fan-in/Fan-out Device for12 Core Multi-Core Fiber," OECC2014, pp. 49-50 (2014).

NPL 8: M. Taylor, "Coherent Detection for Fiber Optic Communications Using Digital Signal Processing," in Optical Amplifiers and Their Applications/Coherent Optical Technologies and Applications, Technical Digest (CD) (Optical Society of America, 2006), paper CThB1.

NPL 9: S. Randel et al., "MIMO-based signal processing for mode-multiplexed transmission," Proc. IEEE Summer Topical Meeting, MC4.1 Seattle (2012).

NPL 10: T. Sakamoto et al., "Strongly-coupled multi-core fiber and its optical characteristics for MIMO transmission systems," Optical Fiber Technology, 35, Pages 8-18 (2017)

SUMMARY OF THE INVENTION

Technical Problem

Existing MIMO transmission systems using an L mode fiber use a transmission system including L transceivers and an L×L MIMO equalizer.

In this case, if one transceiver is a device that transmits and receives polarization-multiplexed signals, optical fibers are designed to propagate L spatial modes (that is, designed to propagate 2L modes combined with polarization and a spatial mode), and on a reception side, a 2L×2L MIMO equalizer is used. In the present specification, unless otherwise specified, a signal beam of light is a polarization-multiplexed signal, and the number of modes refers to a total number of polarization and spatial modes.

In transmission using multi-mode fibers or coupled multi-core fibers, the MIMO equalizer is required, and a transmission capacity, a signal quality, a MIMO signal processing load, and the like of a transmission system to be constructed are determined depending on the number of propagation modes of the optical fiber to be installed. That is, in the optical fiber propagating an L mode, a system is constructed to transmit L signals in parallel by using an L×L MIMO equalizer.

On the other hand, requirements such as the transmission capacity and the signal quality may vary depending on a time elapsed after installation even in the same system. However, unlike a wavelength division multiplexing scheme, it is difficult in the MIMO systems to flexibly control a system performance such as changing the wavelength multiplexing order depending on the requirements.

Furthermore, the signal quality may vary due to variance in system parameters (such as a distance, the number of repeaters, or the number of connection points). For example, a mode dependent loss (MDL) due to an inter-mode loss difference occurring in the transmission line degrades the signal quality. The main causes for such degrade may include a loss difference between the modes generated by a connection point and a bent portion. A method for reducing the MDL has been proposed (see, for example, NPL 5).

However, a technique of NPL 5 includes, for example, installing an MDL compensator in a transmission line, and reducing an amount of axial displacement of a connection point, and thus, in any case, it is necessary to change a hardware configuration in the transmission line. That is, the technique of NPL 5 has a problem in that it is difficult to control MDL characteristics after construction of the transmission line.

Thus, in order to resolve the above-described problems, an object of the present invention is to provide an optical transmission system capable of easily controlling a transmission capacity and an optical signal quality even if a MIMO equalizer is provided.

Means for Solving the Problem

In order to solve the above problems, in the optical transmission system according to the present invention, the number of inputs and outputs of signal beams of light to and from an optical fiber that allows spatial multiplexing transmission is used as a variable parameter, and a transmission capacity and a signal quality of the optical transmission system is controlled using such a parameter.

Specifically, an optical transmission system according to the present invention includes an optical fiber with the number of spatial modes being L (L is an integer of 2 or more), an optical multiplexer connected to one end of the optical fiber, and configured to input signal beams of light from M transmitters (M is a natural number of L or less) to the optical fiber and cause each of the input signal beams of light to be propagated for each of the spatial modes of the optical fiber,
- an optical demultiplexer connected to another end of the optical fiber, and configured to demultiplex a propagated beam of light caused to be propagated through the optical fiber for each of the spatial modes of the optical fiber
- N (N=L) receivers configured to each receive a demultiplexed beam of light obtained by demultiplexing the propagated beam of light by the optical demultiplexer,
- an N×M multiple-input multiple-output (MIMO) equalizer configured to receive N received signals output from the N receivers and output M demodulated signals, and
- a controller configured to instruct the optical multiplexer to change the number M of the signal beams of light input to the optical fiber.

The present optical transmission system is provided with the N×M MIMO equalizer, includes the receivers (N units) equal in number to the spatial multiplexing order L of the optical fiber, and changes the number M of the signal beams of light transmitted through the optical fiber in the range of the spatial multiplexing order L or less. The adjustment of the number M of signal beams of light makes it possible to adjust the transmission capacity and the signal quality of the optical transmission system even after construction of the transmission line, thus allowing performance to be changed without changing the system configuration. Thus, the present invention can provide an optical transmission system capable of easily controlling the transmission capacity and the optical signal quality even if the MIMO equalizer is provided.

In addition, a second optical transmission system according to the present invention includes
- an optical fiber with the number of spatial modes being L (L is an integer of 2 or more), an optical multiplexer connected to one end of the optical fiber, and configured to input signal beams of light from M transmitters (M is a natural number of L or less) to the optical fiber and cause each of the input signal beams of light to be propagated for each of the spatial modes of the optical fiber,
- an optical demultiplexer connected to another end of the optical fiber, and configured to demultiplex a propagated beam of light caused to be propagated through the optical fiber for each of the spatial modes of the optical fiber,
- N (N=L) receivers configured to each receive a demultiplexed beam of light obtained by demultiplexing the propagated beam of light by the optical demultiplexer, and
- an N×M multiple-input multiple-output (MIMO) equalizer configured to receive N received signals output from the N receivers and output M demodulated signals.

The present optical transmission system is provided with the N×M MIMO equalizer, includes the receivers (N units) equal in number to the spatial multiplexing order L of the optical fiber, and sets the number M of the signal beams of light transmitted through the optical fiber to less than the spatial multiplex order L. The adjustment of the number M of the signal beams of light makes it possible to obtain a desired transmission capacity and signal quality of the optical transmission system. Thus, the present invention can provide an optical transmission system capable of easily controlling the transmission capacity and the optical signal quality even if the MIMO equalizer is provided.

Note that the second optical transmission system further includes a controller configured to instruct the optical multiplexer to change the number M of the signal beams of light input to the optical fiber. The adjustment of the number M of signal beams of light makes it possible to adjust the transmission capacity and the signal quality of the optical transmission system even after construction of the transmission line, thus allowing performance to be changed without changing the system configuration.

The optical fiber of the optical transmission system according to the present invention may be a coupled multi-core fiber having inter-mode crosstalk of −30 dB/m or more. In the optical fiber, it is possible to randomly couple all propagation modes and achieve an MDL reduction effect.

The optical transmission system according to the present invention further includes a measuring instrument configured to measure a signal quality of a demodulated signal of the M demodulated signals and a controller that sets the number M of the signal beams of light to the optical multiplexer so that the signal quality measured by the measuring instrument exceeds a threshold value. The present optical transmission system may monitor the signal quality and feed the variation in signal quality back to the number M of the signal beams of light to maintain a desired signal quality.

The optical transmission system according to the present invention further includes a controller configured to have a relationship among the number M of the signal beams of light, a signal-to-noise ratio, and the transmission capacity and sets the number M of the signal beams of light to the optical multiplexer such that a desired signal-to-noise ratio and transmission capacity are satisfied. The present optical transmission system can calculate the number M of the signal beams of light to be set from the desired signal-to-noise ratio and transmission capacity, and reflect the number M on the number of optical signals incident on the optical fiber.

Note that each of the inventions described above can be combined with each other to the extent possible.

Effects of the Invention

The present invention may provide an optical transmission system capable of easily controlling a transmission capacity and an optical signal quality even if a MIMO equalizer is provided.

DESCRIPTION OF EMBODIMENTS

Embodiments of the present invention will be described with reference to the accompanying drawings. The embodiments described below are examples of the present invention and the present invention is not limited to the embodiments described below. Note that components with the same reference signs in the specification and the drawings are assumed to be the same components.

First Embodiment

Figure 1:
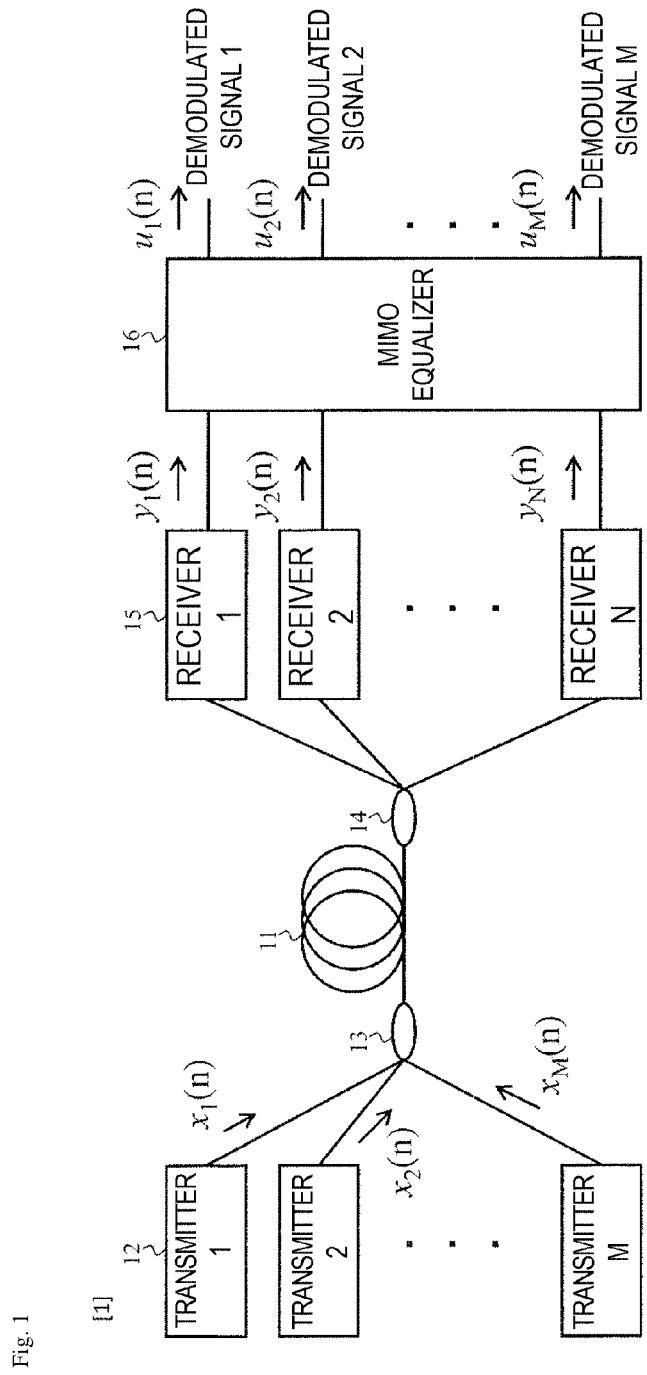
FIG. 1 is a diagram for explaining an optical transmission system according to the present invention.

FIG. 1 is a diagram for explaining an optical transmission system according to the present embodiment. The optical transmission system includes an optical fiber 11 with the number of spatial modes being L (L is an integer of 2 or more), an optical multiplexer 13 connected to one end of the optical fiber 11, and configured to input signal beams of light from M transmitters 12 (M is a natural number less than L) to the optical fiber 11 and cause each of the input signal beams of light to be propagated for each of the spatial modes of the optical fiber 11, an optical demultiplexer 14 being connected to another end of the optical fiber 11, and configured to demultiplex a propagated beam of light caused to be propagated through the optical fiber 11 for each of the spatial modes of the optical fiber 11

N (N=L) receivers 15 configured to each receive a beam of light obtained by demultiplexing the propagated beam of light by the optical demultiplexer 14, and an N×M MIMO equalizer 16 that receives N received signals output from the N receivers 15 and output M demodulated signals.

The optical fiber 11 is a multi-mode fiber or a multi-core fiber. M types of signal beams of light output by the M transmitters 12 are multiplexed by the optical multiplexer 13. The multiplexed signal beam of light is incident on the optical fiber 11. Here, in a case where the optical fiber 11 is a multi-mode fiber, the optical multiplexer 13 is a mode multiplexer (for example, NPL 6) designed so that the input signal is coupled to a propagating mode. In a case where the optical fiber 11 is a multi-core fiber, the optical multiplexer 13 is a fan-in device (for example, NPL 7) designed so that each signal is incident on each core.

The optical demultiplexer 14 demultiplexer the propagated beam of light into N ports. The N receivers 15 respectively receive N types of demultiplexed signal beams of light. In order to acquire an electric field amplitude and phase information of the received signals, such a receiver 15 includes a local oscillation light source, a 90° hybrid, a balanced receiver, an analog-digital converter, and a computer (for example, NPL 8).

The MIMO equalizer 16 compensates for signal degradation of the signal beams of light in the optical fiber 11. The MIMO equalizer 16 is also capable of compensating for a mode variance, a wavelength variance, and a polarization variance. In the present optical transmission system, a MIMO transmission is performed with M inputs and N outputs, and it is possible to perform parallel transmission of M types of signals.

Note that when the signal beam of light is polarization-multiplexed, the polarization-multiplexed signal is propagated through each port. Thus, if the optical demultiplexer 14 demultiplexer the propagated beam of light into N ports, a 2M×2N MIMO equalizer is needed. For simplicity, a case is described where the signal beam of light is not to be polarization-multiplexed.

Figure 2:
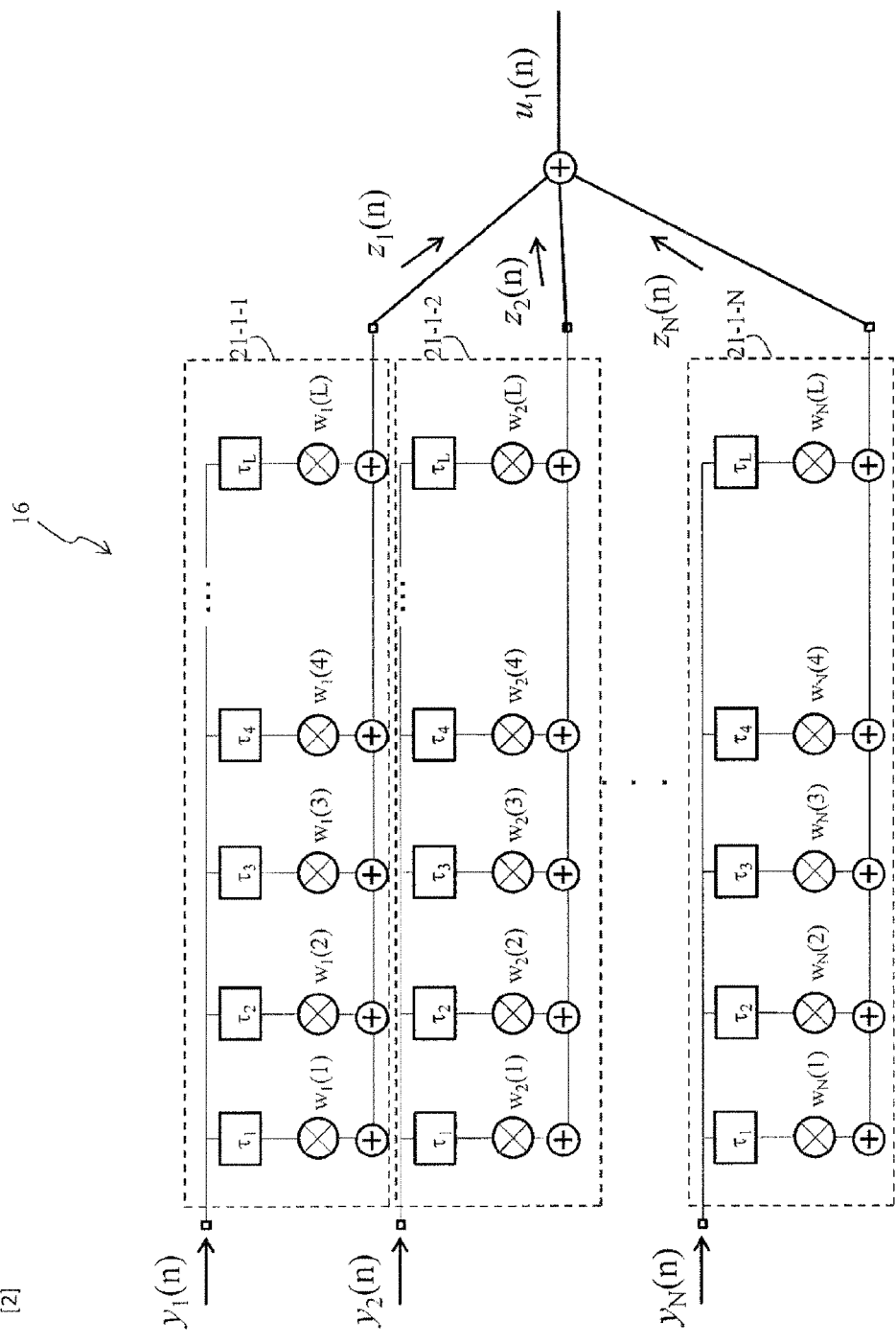
FIG. 2 is a diagram for explaining a MIMO equalizer provided in the optical transmission system according to the present invention.

FIG. 2 is a diagram for explaining the MIMO equalizer 16. Note that FIG. 2 illustrates one equalizer (signal processing unit) that reconstructs a signal transmitted by one of the transmitters 12, and the equalizer includes N FIR filters (21-1-1 to 21-1-N). That is, if there are M transmitters 12, M equalizers are needed, and the MIMO equalizer 16 needs to include N×M FIR filters 21-$m$-$n$ (1≤n≤N, 1≤m≤M).

Each of the FIR filters 21-$m$-$n$ is a signal processing circuit for restoring one of the transmitted signals. The FIR filter 21 includes taps equal in number L of spatial modes of the optical fiber 11. Each of the taps includes a delay element with an amount of delay τ and a multiplier of a coefficient w (tap coefficient). In FIG. 2, the amounts of delay of the taps (1 to L) of the FIR filter 21-1-1 are represented respectively by $\tau_1$ to $\tau_L$, and coefficients are represented by $w_1(1)$ to $w_1(L)$. Output of each of the FIR filters 21-1-$n$ is finally combined.

If the amount of delay τ and the coefficient w of the tap of each of the FIR filters 21-$m$-$n$ are appropriately set, it is possible to compensate for signal degradation due to a mode dispersion, a wavelength variance, and a polarization mode variance, and crosstalk occurring in the optical fiber 11.

Figure 3:
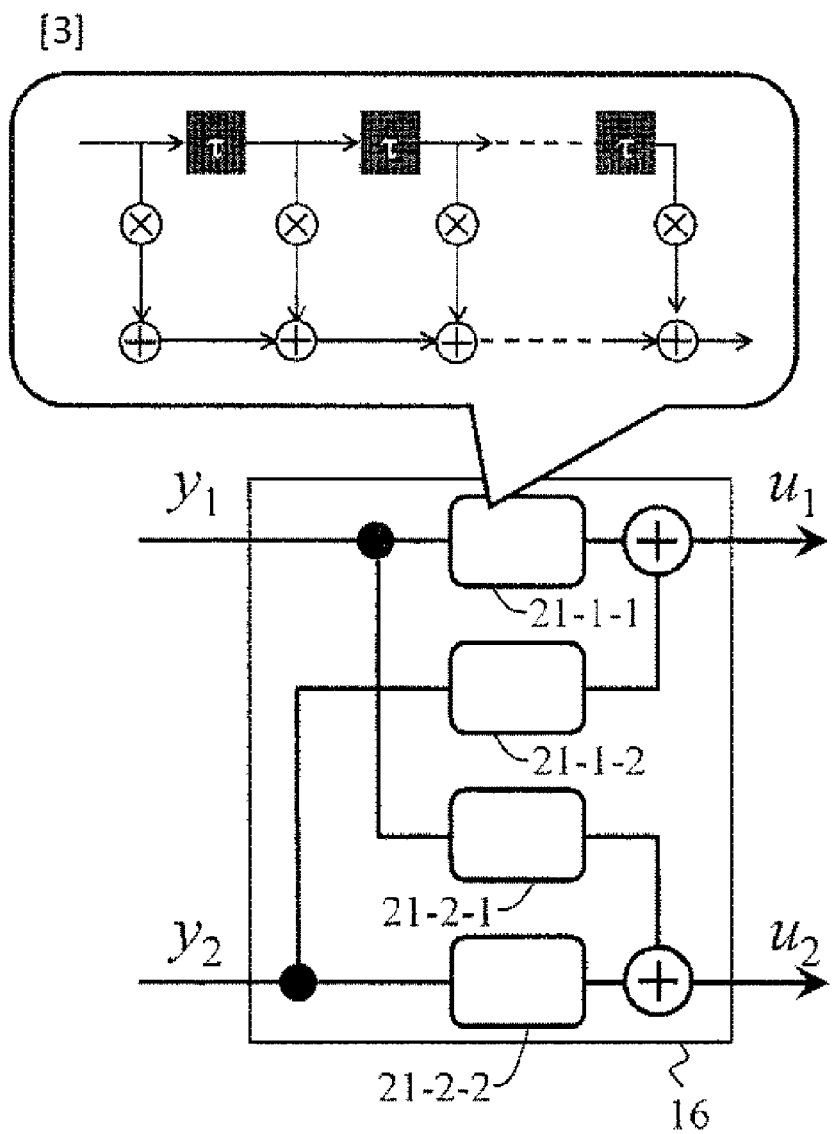
FIG. 3 is a diagram of a 2×2 MIMO equalizer.

FIG. 3 is a diagram for explaining the MIMO equalizer for restoring all the signals when M=N=2 in an example. The MIMO equalizer of FIG. 3 is an example of restoring all the two transmitted signals to obtain reconstructed signals ($u_1$, $u_2$). The MIMO equalizer of FIG. 3 includes the two signal processing units as described in FIG. 2. The number of the FIR filters 21 is M×N, and in this example, 2×2.

Figure 4:
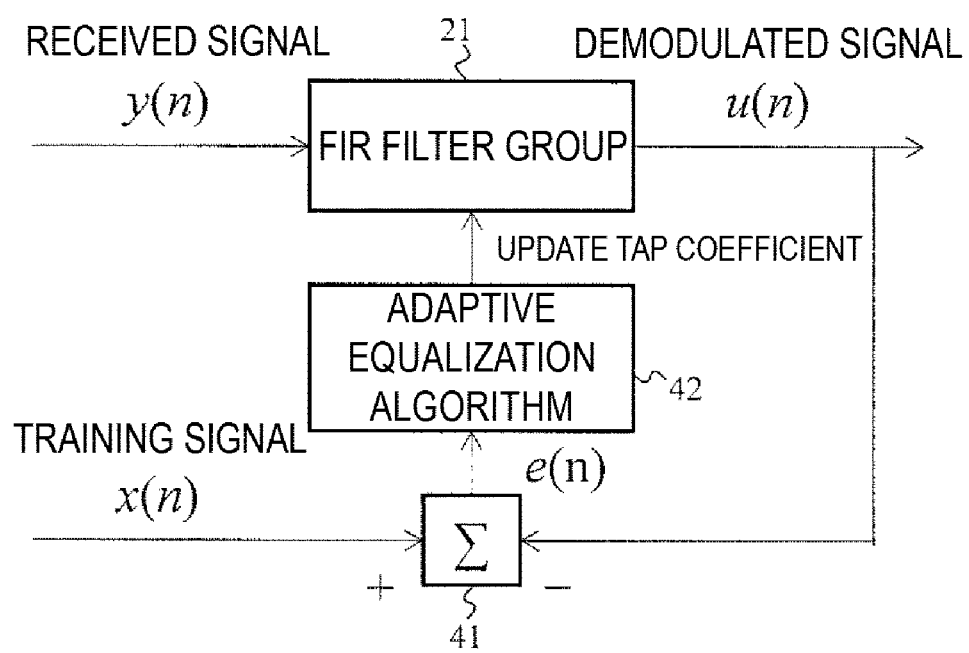
FIG. 4 is a diagram for explaining an application equalization.

FIG. 4 is a diagram for explaining an adaptive equalization algorithm for updating the tap coefficient. In addition to a data field, a known training symbol x(n) is added to the transmitted signal. A comparison unit 41 compares a symbol of the transmitted signal with a demodulated symbol to output an error e(n). An adaptation algorithm 42 controls the tap coefficient of the FIR filter so that the error e(n) is reduced. When the same procedure is repeated by the number of training symbols, the error e(n) is minimized and the tap coefficient is determined. After determining the coefficient by using all of the training symbols, the data field in the posterior part of the transmitted signal is reconstructed by using the tap coefficient determined by the FIR filter 21.

At this time, when the tap coefficient increases, an amount of calculation required to evaluate the correct tap coefficient increases. That is, when the number of transceivers increases, a signal processing load in the MIMO equalizer increases.

An M-mode multiplexing optical transmission system using an existing MIMO equalizer includes M optical transmitters, an L-mode or L-core optical fiber, and N optical receivers, where L=M=N, and uses an M×M MIMO equalizer.

On the other hand, the optical transmission system according to the present embodiment includes M optical transmitters, an L-mode or L-core optical fiber, and N optical receivers, where N=L, M<N, and uses an N×M MIMO equalizer. Note that in a case of a multi-core fiber, when each core operates in a single mode, a polarization mode is present for each core, which results in an L/2 core fiber.

Example

With reference to figures onward from FIG. 5, a feature that the optical transmission system according to the present embodiment can control an MDL characteristic will be described.

Figure 5:
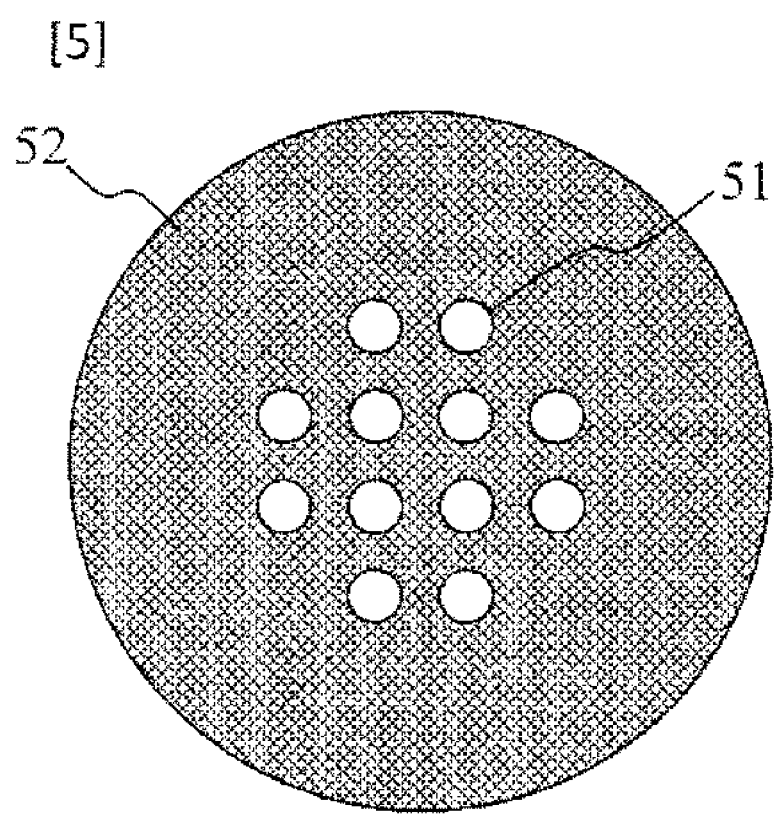
FIG. 5 is a cross-sectional view of a multi-core fiber.

FIG. 5 is a diagram for explaining a cross-section of the optical fiber 11. The optical fiber 11 is a multi-core fiber with 12 cores 51 arranged in a square lattice shape in a cladding region 52. The following calculations are performed for the optical fiber 11 of FIG. 5. The optical fiber 11 has a core radius of 4.8 µm, a normalized index difference of the cores of 0.35%, and a core spacing of 16.4 µm. Each of the cores is structured with a single mode wave guide in bands C to L. That is, the optical fiber 11 is a fiber allowing for propagation of a total of 24 modes including a polarization mode (L=24).

Figure 6:
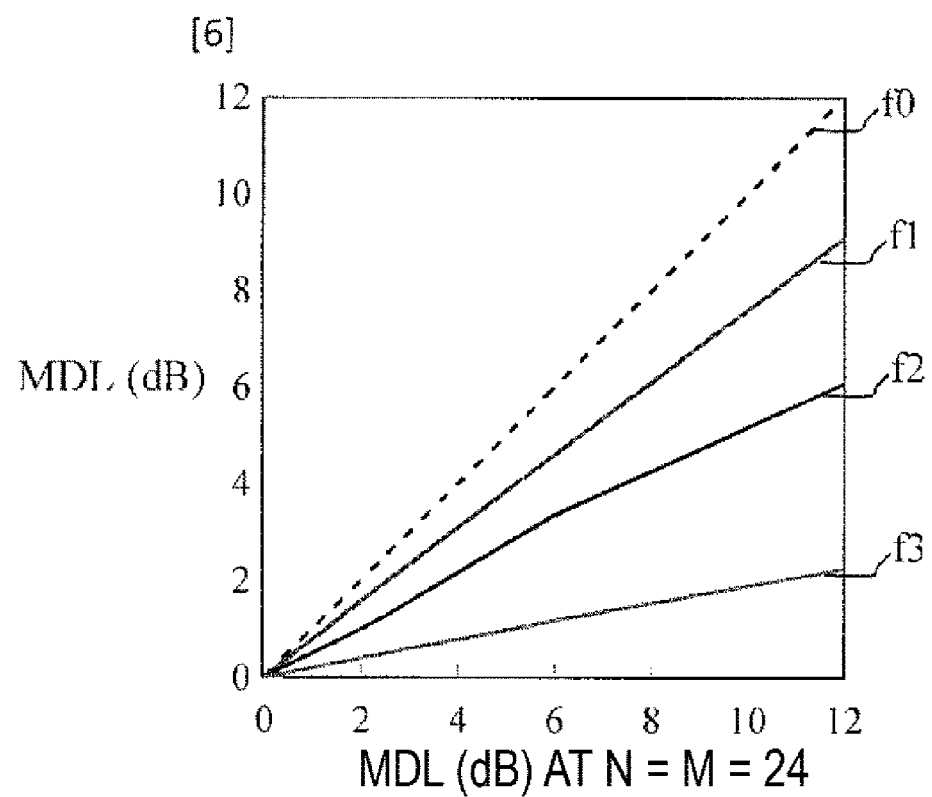
FIG. 6 is a graph showing a calculation result of an MDL value when the number M of input signals is changed in the optical transmission system according to the present invention.

FIG. 6 is a graph showing an effect of the optical transmission system according to the present embodiment. FIG. 6 provides results obtained by calculating the MDL in the optical fiber transmission line having a plurality of connection points axially shifting the optical fiber 11 of FIG. 5. A line f0 represents comparison data of a 24×24 MIMO system where N=M=24 (an existing configuration), and lines f1 to f3 represent data of the N×M MIMO system according to the present embodiment where M<N=L.

f1 represents MDL where M=20 transmitted signals are input and M signals are reconstructed from N=24 received signals.

f2 represents MDL where M=12 transmitted signals are input and M signals are reconstructed from N=24 received signals.

f3 represents MDL where M=4 transmitted signals are input and M signals are reconstructed from N=24 received signals.

Here, it is possible to calculate the MDL as described in NPL 9. That is, λ max indicating a maximum value and λ min indicating a minimum value in M singular values λ1 to λM obtained by singular value decomposition of an N×M channel matrix of the transmission line may be used to evaluate the MDL according to:

MDL (dB)=20 log 10(λ max/λ min)

It can be seen from FIG. 6 that the MDL can be controlled by varying the number M of transmitted signals. Specifically, as M is smaller than L, the MDL can be reduced.

Figure 7:
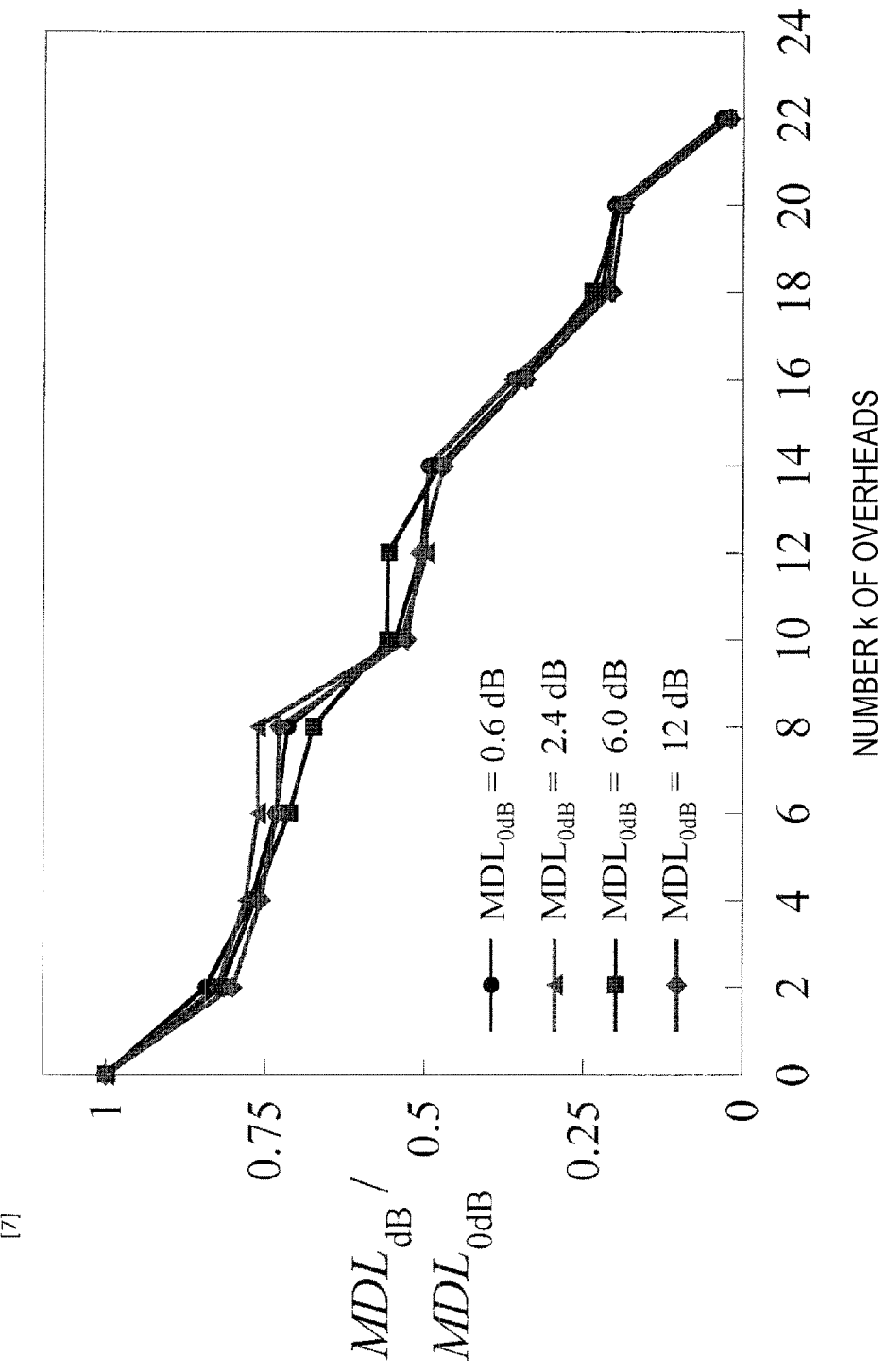
FIG. 7 is a graph showing a calculation result of changes of the number M of input signals and a relative MDL value in the optical transmission system according to the present invention.

FIG. 7 is a graph showing an effect of the optical transmission system according to the present embodiment. $MDL_{0dB}$ represents a value of MDL in decibels in a case of M=N=L (an existing MIMO system). $MDL_{dB}$ represents a value of MDL in decibels, of the optical transmission system according to the present embodiment. A vertical axis represents a ratio of $MDL_{dB}$ to $MDL_{0dB}$ and a horizontal axis represents k=L−M. The number k is a difference between the number L of modes of the optical fiber and the number M of transmitted signals, and is referred to as "number of mode overheads". A smaller ratio of the $MDL_{dB}$ to the $MDL_{0dB}$ on the vertical axis means a further improvement of the MDL from the existing MIMO system.

There were 10 connection points in the transmission line, and an amount of axial shift at each of the connection points was varied in the range from 1 to 4 µm. In this case, $MDL_{0dB}$ varies in the range from 0.6 to 12 dB. FIG. 7 also shows results obtained by varying $MDL_{0dB}$. It can be seen from this that an amount of MDL improvement is the same in decibels regardless of a value of $MDL_{0dB}$.

It can be seen from FIG. 7 that in the optical transmission system according to the present embodiment, the MDL can be improved regardless of a value of $MDL_{0dB}$. For example, in the present optical transmission system with k=L/2, it is possible to reduce the MDL by half in decibels as compared to the existing MIMO system (M=N=L). Specifically, if $MDL_{0dB}$=10 dB, $MDL_{dB}$=5 dB when k=L/2.

Figure 8:
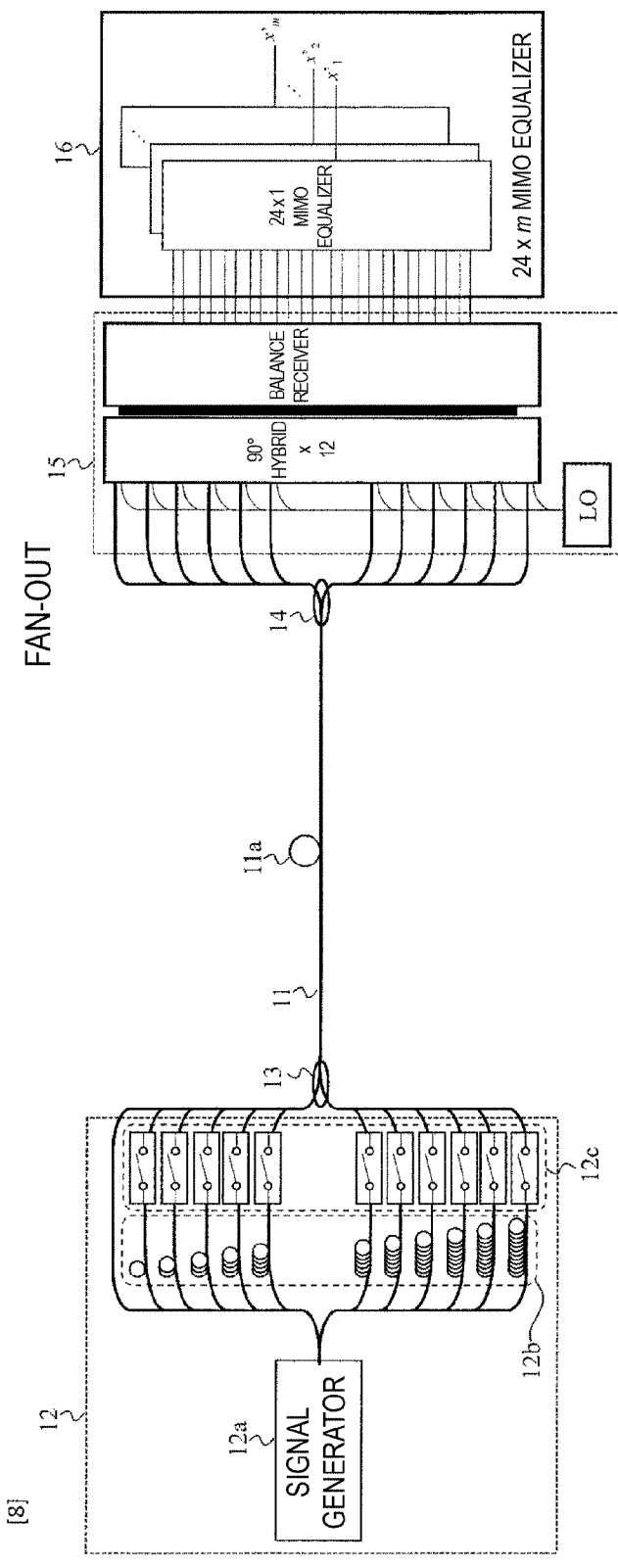
FIG. 8 is a diagram for explaining an optical transmission system according to the present invention.

FIG. 8 is a diagram for explaining a configuration of the optical transmission system according to the present embodiment when an MDL reduction effect is experimentally verified. The transmitter 12 generates a polarization-multiplexed QPSK signal (1.25 Gb/s) in a signal generator 12a, splits the signal into 12 parts with a power coupler, and delays the split signal with delay lines 12b (for example, at intervals of 100 m) each having different lengths from each other to generate 12 signal beams of light. These signal beams of light are independent signal sequences uncorrelated with each other in signal patterns. The transmitter 12 controls the number M of input signals by turning on and off an optical switch 12c.

The optical multiplexer 13 is a fan-in device that inputs these signal beams of light to each of the 12 cores of the optical fiber 11. There are 12 incident ports of the optical multiplexer 13 and polarization-multiplexed signals will propagate through each of the ports. Thus, the present optical transmission system is configured so that M is an even number, but M may also be an odd number. The optical fiber 11 of FIG. 8 includes a bent portion 11a with a bending radius in the range from 6 to 9 mm. Note that the bent portion 11a may not be provided.

The optical demultiplexer 14 is a fan-out device that inputs 24 types of propagated beams of light output from the 12 cores of the optical fiber 11 to the receivers 15. Each of the receivers 15 are a coherent receiver including a 90° hybrid and a balance receiver. The receivers 15 receive the propagated beams of light and inputs the beams of light to the 24×M MIMO equalizer 16. The 24×M MIMO equalizer 16 reconstructs M signals.

Figure 9:
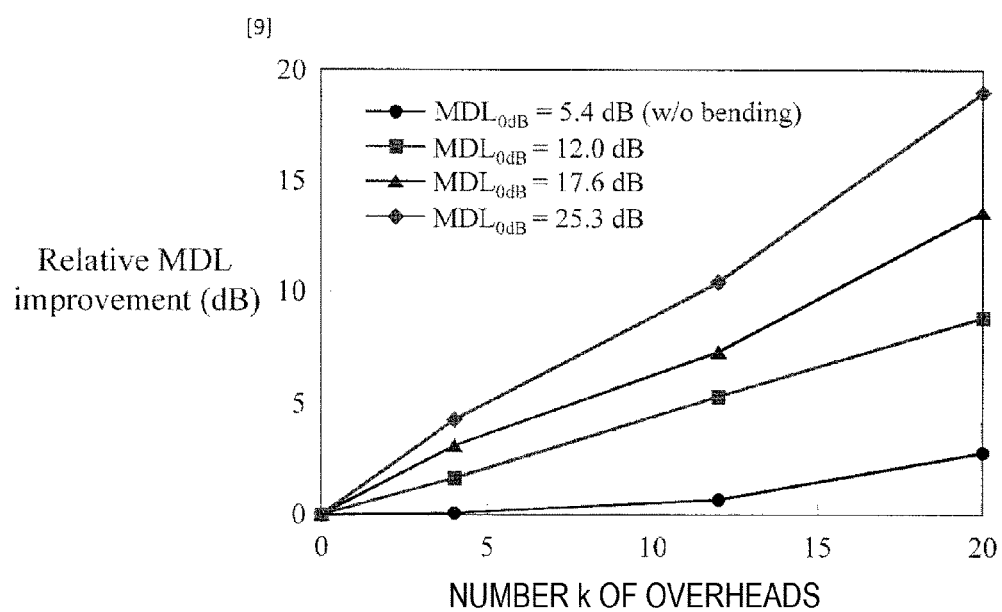
FIG. 9 is a graph showing an amount of MDL improvement by the optical transmission system according to the present invention.

FIG. 9 is a graph for explaining experiment results. A vertical axis indicates an amount of MDL improvement of the present optical transmission system (M<N=L) with respect to the existing MIMO system (M=N=L). A horizontal axis indicates the number k of overheads.

It was confirmed from FIG. 9 that the MDL could be reduced by reducing the number M of signals (increasing the number k of overheads), as in the case of the calculation. Note that in the present experiment, by changing the bending radius of the bent portion 11a in the range from 6 to 9 mm, and by not providing the bent portion 11a, the $MDL_{0dB}$ is changed from 5.4 to 25.3 dB.

Figure 10:
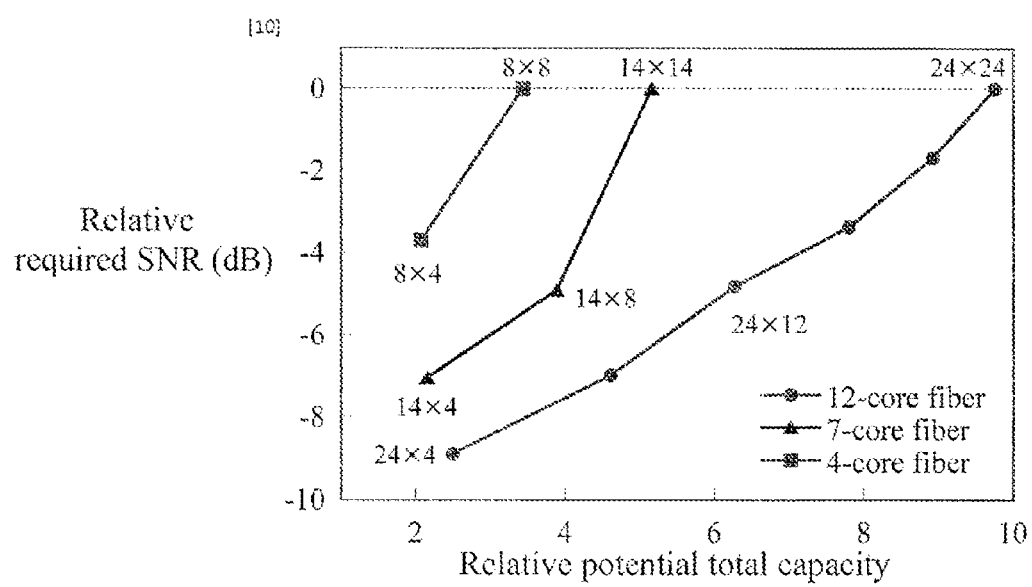
FIG. 10 is a graph showing a transmission capacity and a required SNR for a value of the number M of input signals in the optical transmission system according to the present invention.

FIG. 10 is a graph showing an effect of the optical transmission system according to the present embodiment. For "X×Y" in the graph, X indicates the number N of receivers (=the number L of propagation modes) and Y indicates the number M of incident signal beams of light. For example, "14×8" is data when eight signal beams of light are incident in a case of a seven-core fiber (with the number of modes of 14).

In FIG. 10, a horizontal axis indicates a transmission capacity obtained when M is varied, and a vertical axis indicates a relative value of a signal-to-noise ratio (required SNR) required in each signal. A reference of the value is an SNR value of the M×M MIMO transmission system (M=N=L) in an existing M-mode fiber. After the singular value λ is evaluated from the channel matrix of the transmission line as described above, the transmission capacity is calculated according to the following equation.

[Math. 1]

$$C_{MCF} = \sum_{i=1}^{m} \log_2(1 + \lambda_i^2 SNR) \quad (1)$$

FIG. 10 is shown with the relative value obtained by dividing the evaluated transmission capacity by the transmission capacity obtained in the existing optical fiber (in a case of m=2 where the optical fiber includes one spatial mode, that is, two polarization modes). Here, $C_{MCF}$ is the transmission capacity, and λi is an i-th singular value. The required SNR was set to 20 dB.

From Math. 1, it can be seen that the transmission capacity can be flexibly controlled by the number M of input signals (the number of i). Furthermore, from FIG. 10, it can be seen that the signal quality is improved because the required SNR is reduced by reducing M.

Incidentally, in the configuration of N<L, there is light not received by the receiver, out of the propagated optical signals, and this leads to a loss or an increase in mode-dependent loss, possibly resulting in a decrease in system performance. In the optical transmission system according to the present invention, N=L is established, and thus, it is possible to prevent a loss or an increase in mode-dependent loss and prevent a decrease in system performance.

The optical multiplexer 13 and the optical demultiplexer 14 according to the present embodiment include the number of ports corresponding to the transmitters and receivers such that M=N=L can be achieved. However, if always M<L without realizing M=N=L, it is only required that the optical multiplexer 13 and the optical demultiplexer 14 includes only a required number of ports. An example of an optical transmission system for transmitting and receiving polarization-multiplexed signals is described. A multi-core fiber of the optical transmission system includes L/2 cores to transmit the L mode. If the number of transmitted signals is M, the optical multiplexer 13 and the optical demultiplexer 14 need not include L/2 ports and are only required to include M/2 ports smaller than L/2.

Second Embodiment

In the optical communication system according to the first embodiment, the optical fiber 11 is a multi-mode fiber or a multi-core fiber. Here, when the optical fiber 11 is a coupled multi-core fiber as described in NPL 4, the following advantages are achieved.

In a case of the multi-mode fiber, propagating modes are coupled due to connection points and bent portions, but if a random coupling is not sufficient, the following problems arise. If signal beams of light for M-mode (M<L) are incident on an L-mode multi-mode fiber, a mode distribution may be biased within the optical fiber. Higher order modes within the optical fiber generally have lower optical characteristics than a fundamental mode. Thus, if the incident signal beam of light is distributed to a higher order mode, the improvement effect of the MDL described in the first embodiment may decrease.

On the other hand, in a case of the coupled multi-core fiber, all the propagation modes are randomly coupled along with the propagation. Thus, even when the signal beams of light for the M mode (M<L) are incident on the L-mode multi-core fiber, a sufficient coupling within the optical fiber causes the mode distribution to not be biased. Thus, when the coupled multi-core fiber is used for the optical fiber 11 of the optical transmission system explained in FIG. 1, the improvement effect of the MDL is obtained without any decrease.

Here, as described in NPL 4 or 10, the coupled multi-core fiber has a characteristic that causes, with the core spacing being in the range from 16 μm to 25 μm, a group delay spread to increase with respect to the transmission distance in proportion to a square root of a distance.

Figure 11:
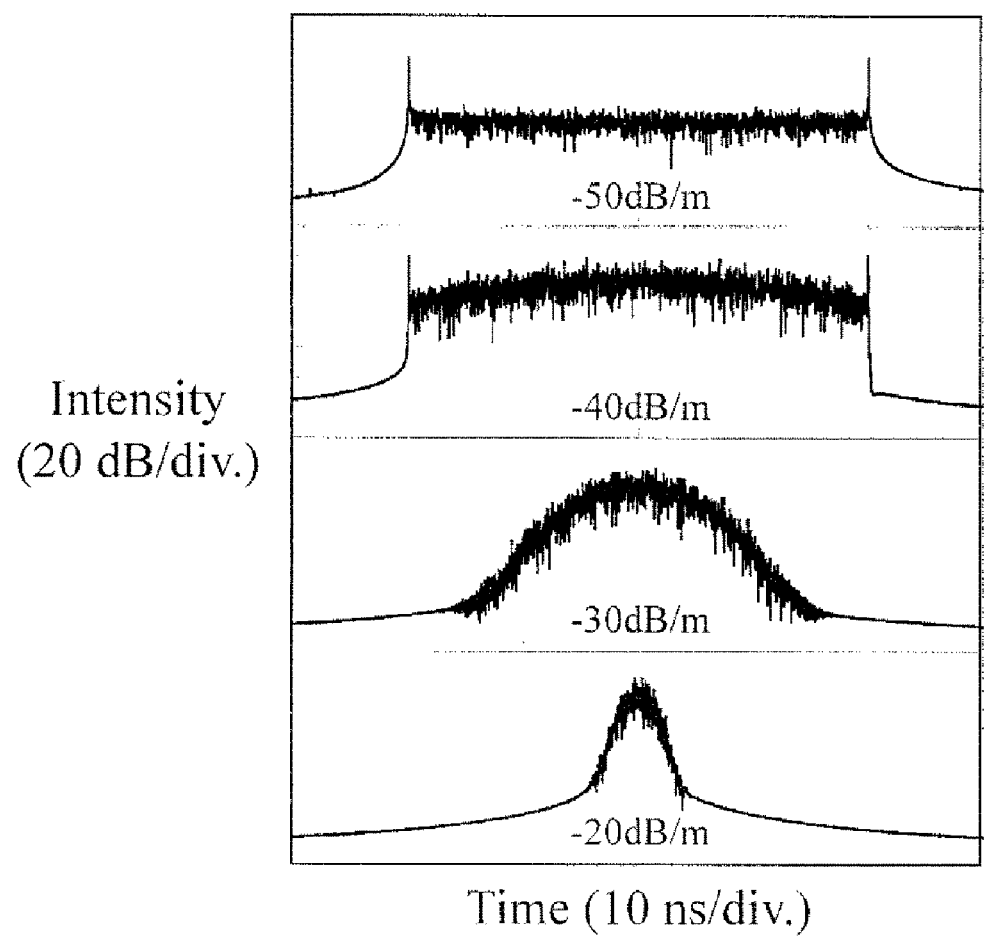
FIG. 11 is a graph showing calculation results of an inter-mode crosstalk and an impulse response waveform.

Here, what amount of coupling gives the random coupling to reduce the impulse response width is calculated. FIG. 11 is a graph for explaining a result obtained by calculating an impulse response shape obtained when an amount of coupling of a multi-core fiber is changed. A relay section interposed between optical amplifiers is generally 40 km or more, and therefore, a transmission distance is set to 40 km. The DMD between the modes is assumed to be 1 ns/km, for convenience.

In the case of the amount of coupling of −50 dB/m, a pulse indicating a large intensity is present on both ends, and a width of the pulse is 40 ns the same as of an accumulated DMD (1 ns/km×40 km). In the case of the amount of coupling of −40 dB/m, although the pulse intensity on both ends decreases, the impulse response width is the same as of the accumulated DMD.

On the other hand, in the case of the amount of coupling of −30 dB/m, the impulse response shape is a Gaussian shape. It is well known that in a case that the inter-mode coupling is strong, the impulse response shape is a Gaussian shape. In the case of the amount of coupling of −20 dB/km, it can be seen that the Gaussian shape is similarly obtained, but a width thereof is further smaller.

As described above, it can be thought that the random coupling occurs in the region of the amount of coupling of −30 dB/m or more where it is possible to reduce the impulse response width. If the amount of coupling is −20 dB/m, a more random coupling occurs, which is more desirable.

Third Embodiment

Figure 12:
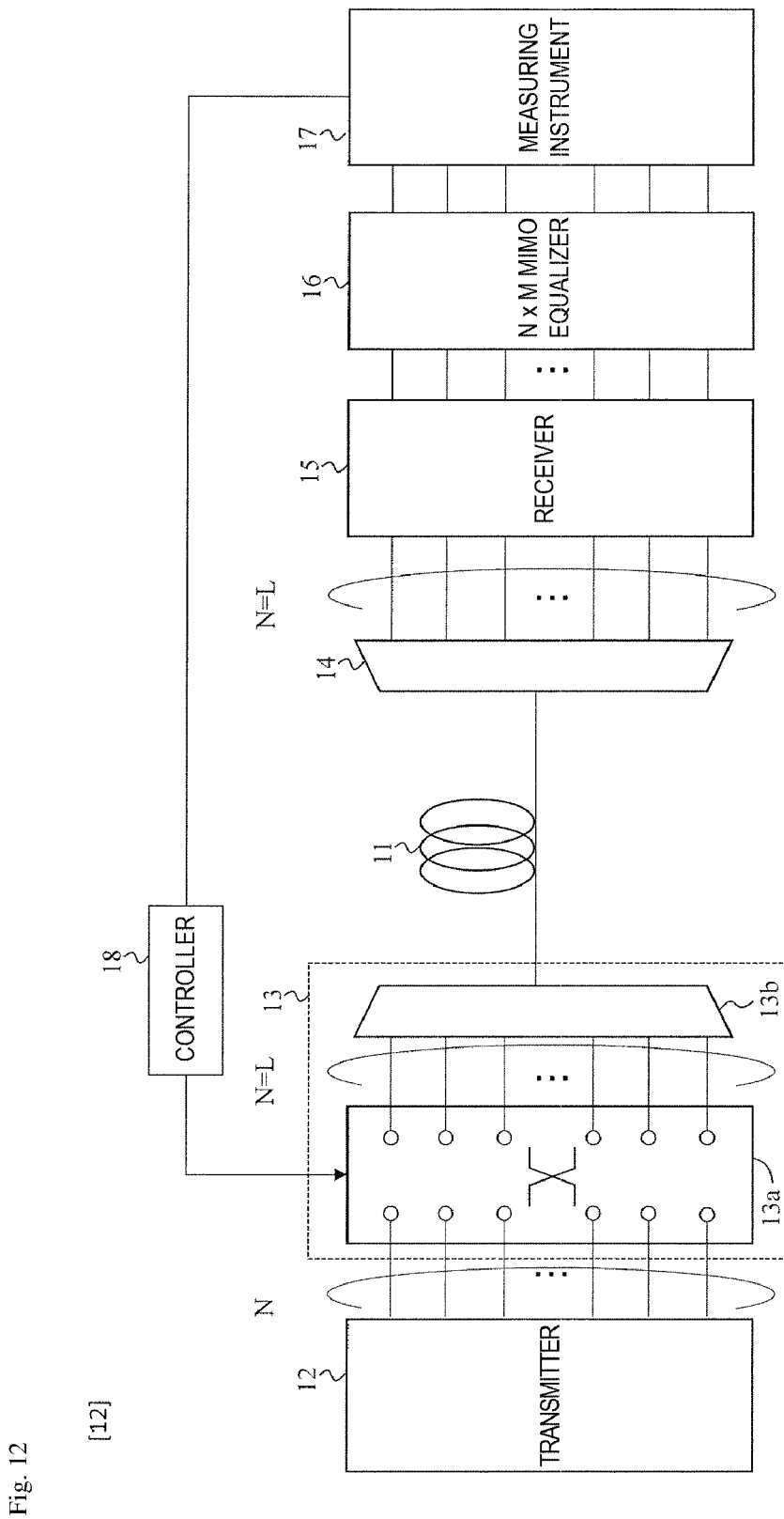
FIG. 12 is a diagram for explaining an optical transmission system according to the present invention.

FIG. 12 is a diagram for explaining an optical transmission system according to the present embodiment. The optical multiplexer 13 of the present optical transmission system is characterized as having a function of changing the number M of signal beams of light incident on the optical fiber 11. Specifically, the optical multiplexer 13 includes a multiplexing unit 13b that serves as a mode multiplexer if the optical fiber 11 is a multi-mode fiber and as a fan-in device if the optical fiber 11 is a multi-core fiber, and an optical switch 13a used to input signal beams of light into any M ports from among N ports of the multiplexing unit 13b.

As described above, it is possible to control a transmission capacity and a signal quality by changing the number M of signal beams of light caused to be propagated through the optical fiber 11. In this case, it is difficult to replace a hardware configuration such as a mode multiplexer and a fan-in device. Thus, when the optical multiplexer 13 is provided with a function (the optical switch 13a) of changing the number M of signal beams of light incident on the optical fiber 11, it is possible to eliminate a need for replacing the devices. For example, when the number M of signal beams of light is dynamically changed according to a transmission capacity demand varying in time by using the optical switch 13a, it is possible to change a system performance without changing the hardware of the optical transmission line system.

Note that in the optical transmission system of the present embodiment, not only the number M of signal beams of light is less than the number N of receivers, but the number M of signal beams of light may be equal to the number N of receivers (=the number L of spatial modes). That is, M can be controlled as a variable parameter varying in the range from 1 to N.

In this case, the optical transmission system preferably further includes a controller 18 that sets the number M of the signal beams of light to the optical multiplexer 13, where the number M satisfies a desired signal-to-noise ratio and transmission capacity. Here, the controller 18 has a relationship (for example, Math. 1) among the number M of signal beams of light, the signal-to-noise ratio, and the transmission capacity. When a required SNR and a transmission capacity demand are input to the controller 18, the controller 18 calculates the required SNR and the number M of signal beams of light satisfying the transmission capacity demand to instruct the switch 13a to switch.

Additionally, the optical transmission system may be configured to further include a measuring instrument 17 that measures a signal quality of the demodulated signals and the controller 18 that sets the number M of the signal beams of light to the optical multiplexer 13 so that the signal quality measured by the measuring instrument 17 exceeds a threshold value. The measuring instrument 17 measures the quality of the signal having been transmitted to the optical fiber 11 for feedback, and the controller 18 calculates the number M of signal beams of light allowing for a desired signal quality to be obtained and instructs the switch 13a to switch. With such a configuration, it is possible to dynamically change the number M of signal beams of light according to the temporal change of the signal quality to maintain the required signal quality without a need of changing the hardware of the optical transmission line system.

INDUSTRIAL APPLICABILITY

The present invention can be used as a transmission medium in an optical transmission system.

REFERENCE SIGNS LIST

11: Optical fiber
12: Transmitter
12a: Signal generator
12b: Delay line
12c: Optical switch
13: Optical multiplexer
13a: Optical switch
13b: Optical multiplexing unit
14: Optical demultiplexer
15: Receiver
16: N×M MINO equalizer
17: Measuring instrument
18: Controller
21, 21-1-1, . . . , 21-$m$-$n$, . . . 21-M-N: FIR filter
41: Comparison unit
42: Adaptive equalization algorithm
51: Core
52: Clad

The invention claimed is:

1. An optical transmission system, comprising:
an optical fiber configured for spatial multiplexing with the number of spatial modes being L (L is an integer of 2 or more);
an optical multiplexer being connected to one end of the optical fiber, and configured to input signal beams of light from M transmitters (M is a natural number of L or less) to the optical fiber and cause each of the input signal beams of light to be propagated for each of the spatial modes of the optical fiber;
an optical demultiplexer being connected to another end of the optical fiber, and configured to demultiplex a propagated beam of light caused to be propagated through the optical fiber for each of the spatial modes of the optical fiber;
N (N=L) receivers configured to each receive a demultiplexed beam of light obtained by demultiplexing the propagated beam of light by the optical demultiplexer;
an N×M multiple-input multiple-output (MIMO) equalizer configured to receive N received signals output from the N receivers and output M demodulated signals;
a controller configured to instruct the optical multiplexer to change the number M of the signal beams of light input to the optical fiber; and
a measuring instrument configured to measure a signal quality of a demodulated signal of the M demodulated signals and notify the controller of the number M of the signal beams of light so that the signal quality exceeds a threshold value.

2. An optical transmission system, comprising:
an optical fiber configured for spatial multiplexing with the number of spatial modes being L (L is an integer of 2 or more);
an optical multiplexer being connected to one end of the optical fiber, and configured to input signal beams of light from M transmitters (M is a natural number of L or less) to the optical fiber and cause each of the input signal beams of light to be propagated for each of the spatial modes of the optical fiber;

an optical demultiplexer being connected to another end of the optical fiber, and configured to demultiplex a propagated beam of light caused to be propagated through the optical fiber for each of the spatial modes of the optical fiber;

N (N=L) receivers configured to each receive a demultiplexed beam of light obtained by demultiplexing the propagated beam of light by the optical demultiplexer;

an N×M multiple-input multiple-output (MIMO) equalizer configured to receive N received signals output from the N receivers and output M demodulated signals; and a controller configured to instruct the optical multiplexer to change the number M of the signal beams of light input to the optical fiber, wherein the controller has a relationship among the number M of the signal beams of light, a signal-to-noise ratio, and a transmission capacity and calculates the number M of the signal beams of light such that a desired signal-to-noise ratio and transmission capacity are satisfied.

3. The optical transmission system according to claim 1, wherein the optical fiber is a coupled multi-core fiber having inter-mode crosstalk of −30 dB/m or more.

4. The optical transmission system according to claim 2, wherein the optical fiber is a coupled multi-core fiber having inter-mode crosstalk of −30 dB/m or more.

* * * * *